US012771200B2

(12) United States Patent
Ha et al.

(10) Patent No.: US 12,771,200 B2
(45) Date of Patent: Oct. 20, 2026

(54) MOTOR HAVING CAP FOR FIXING BUSBAR

(71) Applicant: LG INNOTEK CO., LTD., Seoul (KR)

(72) Inventors: Han Jong Ha, Seoul (KR); Se Jong Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 260 days.

(21) Appl. No.: 18/708,083

(22) PCT Filed: Nov. 8, 2022

(86) PCT No.: PCT/KR2022/017434
§ 371 (c)(1),
(2) Date: May 7, 2024

(87) PCT Pub. No.: WO2023/080757
PCT Pub. Date: May 11, 2023

(65) Prior Publication Data

US 2024/0429767 A1 Dec. 26, 2024

(30) Foreign Application Priority Data

Nov. 8, 2021 (KR) ........................ 10-2021-0152186
Nov. 24, 2021 (KR) ........................ 10-2021-0162950

(51) Int. Cl.
*H02K 3/34* (2006.01)
*H02K 3/50* (2006.01)

(52) U.S. Cl.
CPC ............... *H02K 3/345* (2013.01); *H02K 3/50* (2013.01); *H02K 2203/09* (2013.01)

(58) Field of Classification Search
CPC ............ H02K 3/345; H02K 3/34; H02K 3/32; H02K 3/38; H02K 3/40; H02K 2203/09; H02K 5/22
See application file for complete search history.

(56) References Cited

U.S. PATENT DOCUMENTS

2017/0373563 A1* 12/2017 Kim ................... H02K 11/0094
2019/0140496 A1* 5/2019 Hong ....................... H02K 3/50
(Continued)

FOREIGN PATENT DOCUMENTS

JP 2019-115123 A 7/2019
KR 10-2018-0060817 A 6/2018
(Continued)

*Primary Examiner* — Oluseye Iwarere
*Assistant Examiner* — Nicholas Lee Setzer
(74) *Attorney, Agent, or Firm* — Birch, Stewart, Kolasch & Birch, LLP

(57) ABSTRACT

The present invention may provide a motor including a shaft, a rotor coupled to the shaft, a stator disposed to correspond to the rotor, a housing which accommodates the stator, and a cap disposed on the housing, wherein the stator includes a stator core, an insulator coupled to the stator core, and a coil disposed on the insulator and includes a busbar electrically connected to the coil and a busbar holder which supports the busbar, the cap includes a hole through which the busbar passes and a protruding portion protruding from a lower surface of the cap, and the protruding portion is in contact with a stepped surface of the busbar.

18 Claims, 20 Drawing Sheets

(56) References Cited

U.S. PATENT DOCUMENTS

2019/0351934 A1* 11/2019 Kim .................... B62D 5/0403
2020/0195097 A1* 6/2020 Kodama ................ H02K 11/33
2020/0280235 A1* 9/2020 Natsumeda ............ H02K 1/278
2020/0287441 A1* 9/2020 Ryu ......................... H02K 1/12
2020/0321832 A1* 10/2020 Kim ................... H02K 11/0094
2021/0305870 A1* 9/2021 Takahashi ................ H02K 5/08

FOREIGN PATENT DOCUMENTS

KR 10-2019-0089390 A 7/2019
WO WO 2018/051988 A1 3/2018

* cited by examiner

[FIG. 13]
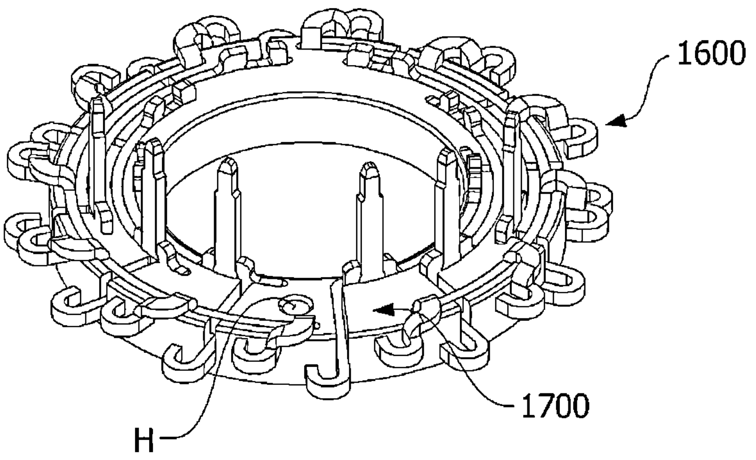

[FIG. 14]
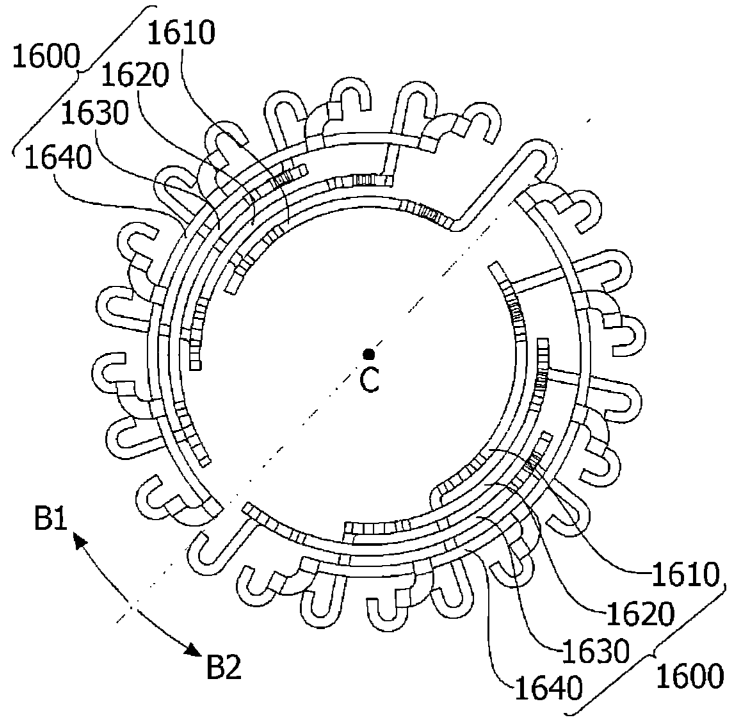

[FIG. 15]
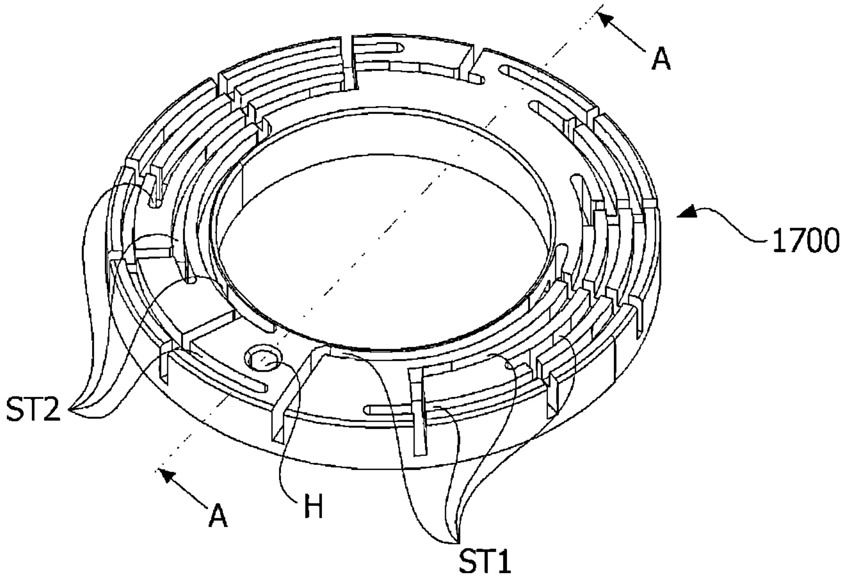

[FIG. 16]
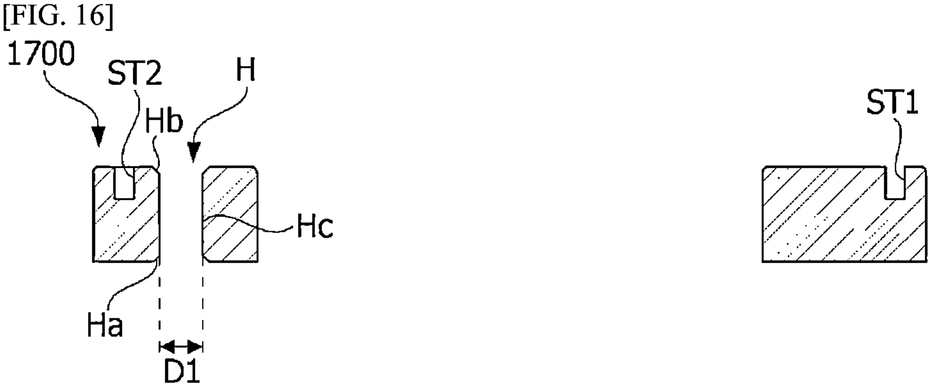

[FIG. 17]
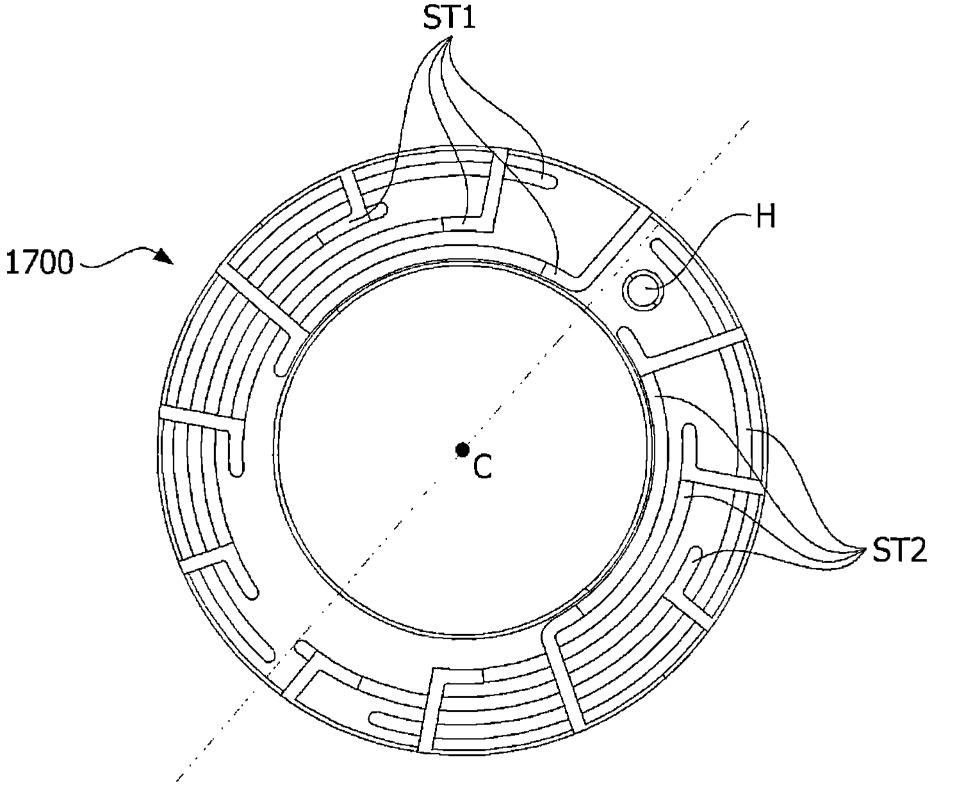

[FIG. 18]
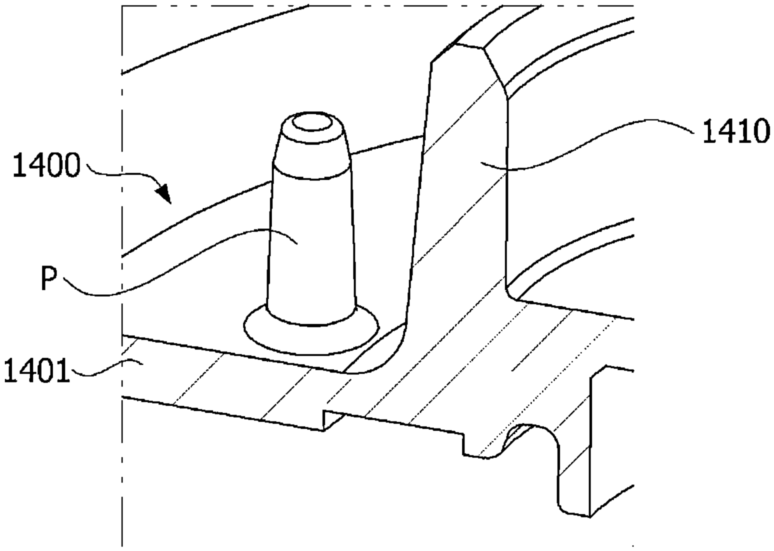

[FIG. 19]
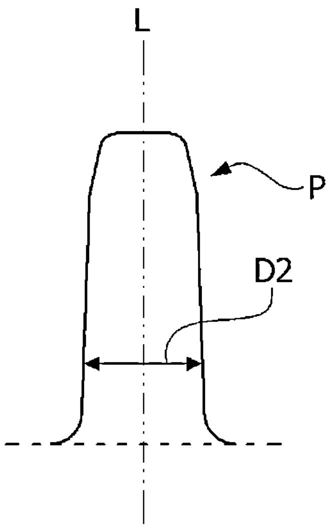

[FIG. 20]
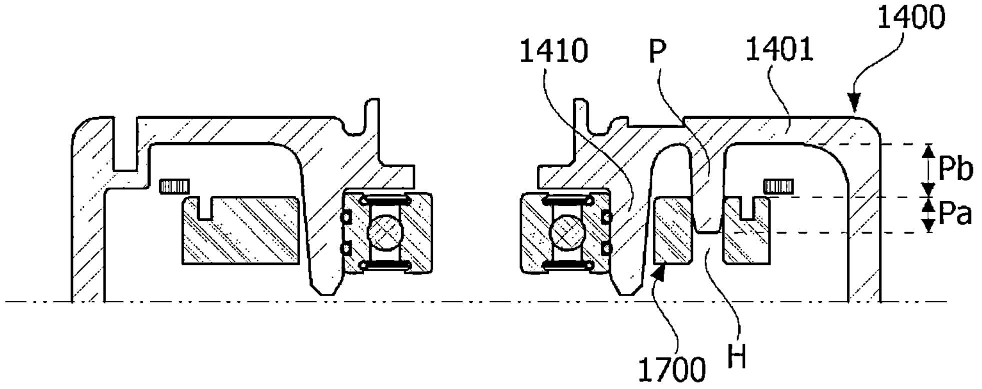

MOTOR HAVING CAP FOR FIXING BUSBAR

CROSS REFERENCE TO RELATED APPLICATIONS

This application is the National Phase of PCT/KR2022/017434 filed on Nov. 8, 2022, which claims priority under 35 U.S.C. § 119(a) to Patent Application Nos. 10-2021-0152186 filed in the Republic of Korea on Nov. 8, 2021, and 10-2021-0162950 filed in the Republic of Korea on Nov. 24, 2021, all of which are hereby expressly incorporated by reference into the present application.

TECHNICAL FIELD

The present invention relates to a motor.

BACKGROUND ART

Generally, a rotor of a motor is rotated by an electromagnetic interaction between the rotor and a stator. In this case, a shaft connected to the rotor rotates to generate a rotational driving force.

The rotor and the stator are accommodated in a housing. The housing is a hollow cylindrical member.

The stator may include a stator core and a coil wound around the stator core. The coil may be connected to a busbar. The busbar is supported in a busbar holder. Three busbars with a U-phase, a V-phase, and a W-phase may be provided. The busbar holder may be a mold part surrounding the busbar.

An end portion of the busbar may be connected to an external device. The end portion of the busbar connected to an external power source passes through the housing to be exposed to the outside of the housing. A hole through which the end portion of the busbar passes may be formed in the housing. A cap is mounted over the hole of the housing to block foreign matter from being introduced into the hole. The end portion of the busbar passes through the cap, and an end of the busbar is disposed outside the cap in a process of mounting the cap is mounted over the hole of the housing.

A location of the end of the busbar passing through the cap should be aligned with a preset position at which an external device is connected. However, there is a problem that the location of the end of the busbar passing through the cap is changed when an external force such as pulling the busbar in an axial direction is applied.

In addition, there is a problem that it is very difficult to precisely manage a location of the busbar because the busbar is bent or an accumulated tolerance among the stator, the busbar, and the housing occurs in a manufacturing process of the busbar.

DISCLOSURE

Technical Problem

The present invention is directed to providing a motor in which a location of an end of a busbar protruding outward from a cap is fixed without a change due to an external force, the movement of the busbar due to vibrations is prevented, and the location of the end of the busbar connected to an external device is precisely managed.

Objectives to be achieved by the present invention are not limited to the above-described objectives, and other objectives, which are not described above, may be clearly understood by those skilled in the art through the following specification.

Technical Solution

One aspect of the present invention provides a motor including a shaft, a rotor coupled to the shaft, a stator disposed to correspond to the rotor, a housing which accommodates the stator, and a cap disposed on the housing, wherein the stator includes a stator core, an insulator coupled to the stator core, and a coil disposed on the insulator and includes a busbar electrically connected to the coil and a busbar holder which supports the busbar, the cap includes a hole through which the busbar passes and a protruding portion protruding from a lower surface of the cap, and the protruding portion is in contact with a stepped surface of the busbar.

Another aspect of the present invention provides a motor including a shaft, a rotor coupled to the shaft, a stator disposed to correspond to the rotor, a housing which accommodates the stator, and a cap disposed on the housing, wherein the stator includes a stator core, an insulator coupled to the stator core, and a coil disposed on the insulator and includes a busbar electrically connected to the coil and a busbar holder which supports the busbar, the busbar includes a first busbar and a second busbar, the first busbar is disposed on the cap, the second busbar is connected to the coil, the first busbar is coupled to the second busbar, and the cap is in contact with the second busbar.

Still another aspect of the present invention provides a motor including a shaft, a rotor coupled to the shaft, a stator disposed to correspond to the rotor, and a housing which accommodates the stator, wherein the stator includes a stator core, an insulator coupled to the stator core, and a coil disposed on the insulator and includes a busbar electrically connected to the coil and a busbar holder which supports the busbar, the housing includes a protrusion protruding from one surface of the housing in an axial direction, and the protrusion is coupled to the busbar.

Yet another aspect of the present invention provides a motor including a shaft, a rotor coupled to the shaft, a stator disposed to correspond to the rotor, and a housing which accommodates the stator, wherein the stator includes a stator core, an insulator coupled to the stator core, and a coil disposed on the insulator and includes a busbar electrically connected to the coil and a busbar holder which supports the busbar, the housing includes a protrusion protruding from an inner surface of the housing, the busbar holder includes a groove or hole, and the protrusion is fitted into the groove or the hole.

Advantageous Effects

According to an embodiment, since a protruding portion of a cap is formed to press a stepped surface of a busbar, there is an advantage that a location of an end of the busbar is fixed without a change even by an external force such as a force for pulling the busbar in an axial direction.

According to an embodiment, since a protruding portion of a cap presses a busbar in many directions, there is an advantage of more stably preventing the movement of the busbar.

According to an embodiment, a first busbar, as a separate part, can be coupled to a second busbar fixed to a busbar holder, and since a protruding portion of a cap presses the second busbar, there is an advantage of significantly reducing a tolerance occurring at an end of the first busbar.

According to an embodiment, since a location of a busbar holder is fixed through a protrusion disposed on a housing, an accumulated tolerance occurring at a stator is removed, and thus there is an advantage of more precisely managing a location of an end of a busbar connected to an external device.

According to an embodiment, since a protrusion protruding in an axial direction is coupled to a busbar holder, there is an advantage of preventing a slip occurrence between a stator and a housing in a circumferential direction.

According to an embodiment, since a protrusion having a tapered shape of which an outer diameter decreases is provided, when a housing and a busbar holder are easily coupled, there is an advantage of more precisely managing a location of an end of a busbar in an axial direction.

DESCRIPTION OF DRAWINGS

FIG. 13 is a perspective view illustrating a busbar and a busbar holder.

FIG. 14 is a front view illustrating the busbar illustrated in FIG. 14.

FIG. 15 is a perspective view illustrating the busbar holder.

FIG. 16 is a side cross-sectional view illustrating the busbar holder along line A-A of FIG. 15.

FIG. 17 is a plan view illustrating the busbar holder.

FIG. 18 is a partially enlarged view illustrating a bottom portion of a housing.

FIG. 19 is a side view illustrating a protrusion.

FIG. 20 is a side cross-sectional view illustrating the housing and a busbar holder.

MODES OF THE INVENTION

A direction parallel to a longitudinal direction (vertical direction) of a shaft is referred to as an axial direction, a direction perpendicular to the axial direction of the shaft is referred to as a radial direction, and a direction along a circle having a radius in the radial direction from the shaft is referred to as a circumferential direction.

Figure 1:
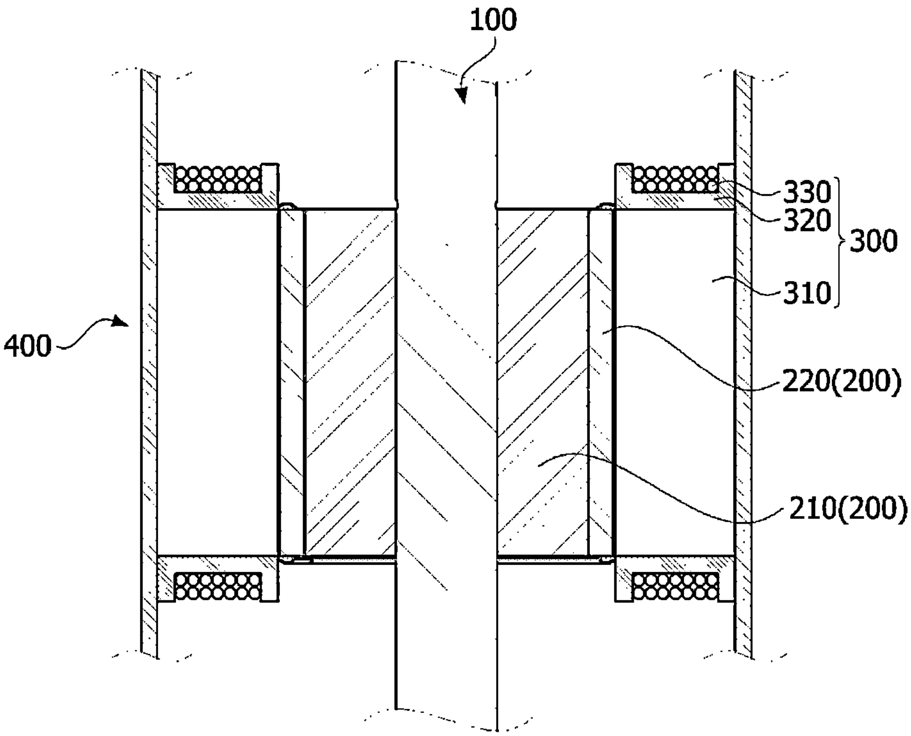
FIG. 1 is a view illustrating a motor according to an embodiment.

FIG. 1 is a view illustrating a motor according to an embodiment.

Referring to FIG. 1, the motor according to the embodiment may include a shaft 100, a rotor 200, a stator 300, and a housing 400. Hereinafter, the term “inward” is a direction from a housing 400 toward the shaft 100 which is a center of the motor, and the term “outward” is a direction opposite to “inward” that is a direction from the shaft 100 toward the housing 400. In addition, a radial direction is defined based on an axial center of the shaft 100.

The shaft 100 may be coupled to the rotor 200. When an electromagnetic interaction occurs between the rotor 200 and the stator 300 by supplying a current, the rotor 200 rotates, and the shaft 100 rotates in conjunction with the rotation of the rotor 200.

The rotor 200 rotates due to an electrical interaction with the stator 300. The rotor 200 may be disposed inside the stator 300.

The stator 300 is disposed outside the rotor 200. The stator 300 may include a stator core 310, an insulator 320 mounted on the stator core 310, and a coil 330. The coil 330 may be wound around the insulator 320. The insulator 320 is disposed between the coil 330 and the stator core 310 and serves to electrically insulate the stator core 310 from the coil 330. The coil 330 induces an electrical interaction with a magnet of the rotor 200.

The stator 300 and the rotor 200 are disposed inside the housing 400.

Figure 2:
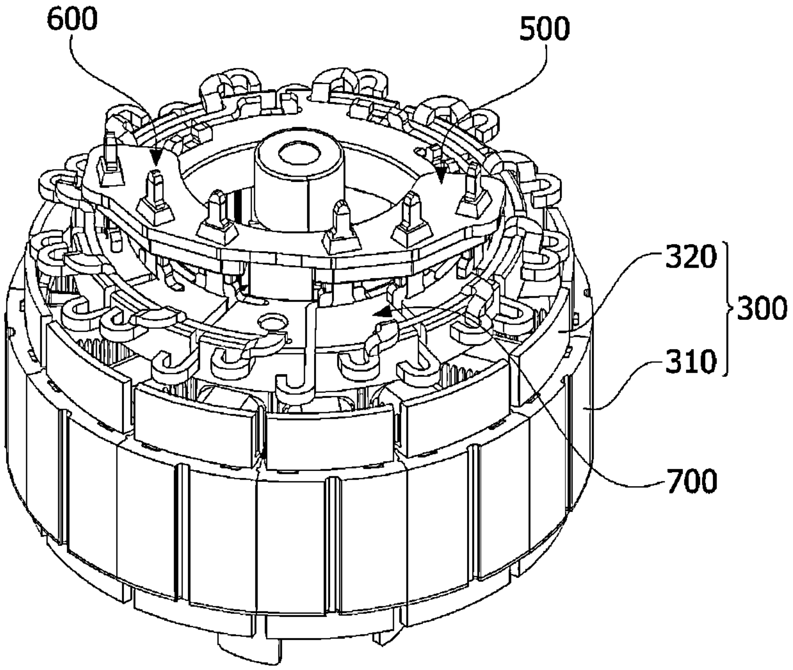
FIG. 2 is a view illustrating a busbar, a busbar holder, and a stator on which a cap is mounted.

FIG. 2 is a view illustrating a busbar 600, a busbar holder 700, and a stator 300 on which a cap 500 is mounted.

An end portion of the busbar 600 connected to an external device passes through the housing 400 and protrudes and is exposed to the outside of the housing 400. The cap 500 prevents water or foreign matter from being introduced into the housing 400 and serves to align a location of the end portion of the busbar 600 by guiding the end portion of the busbar 600. The cap 500 may be formed of an insulating material.

Referring to FIG. 2, the busbar holder 700 is disposed on the insulator 320 of the stator 300. A plurality of busbars 600 are fixed to the busbar holder 700. Some of the plurality of busbars 600 are neutral busbars 600, and the other busbars 600 may be three busbars 600 of a U-phase, a V-phase, and a W-phase. The cap 500 may be disposed on the busbars 600 and connected to end portions of the busbars 600.

Figure 3:
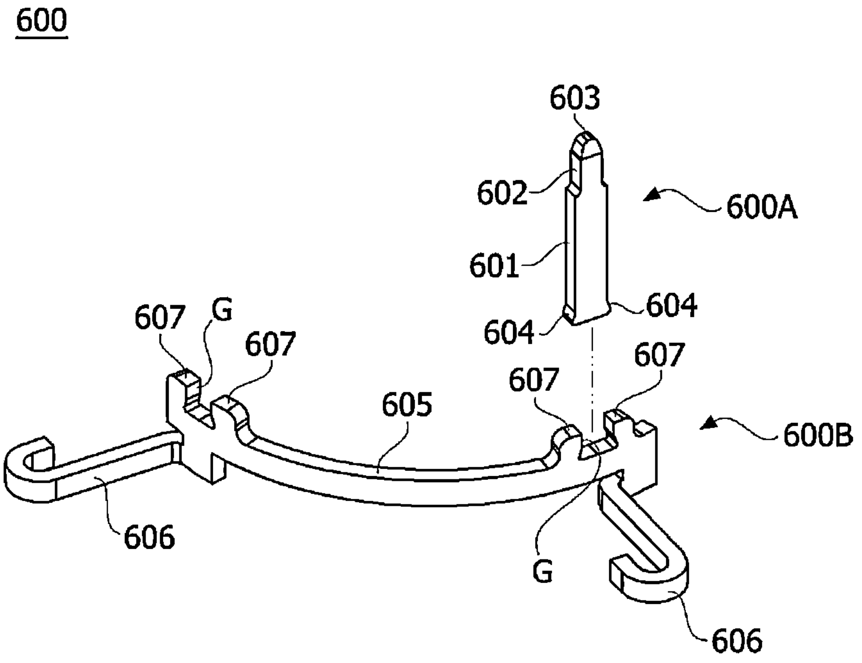
FIG. 3 is a perspective view illustrating the busbar.
Figure 4:
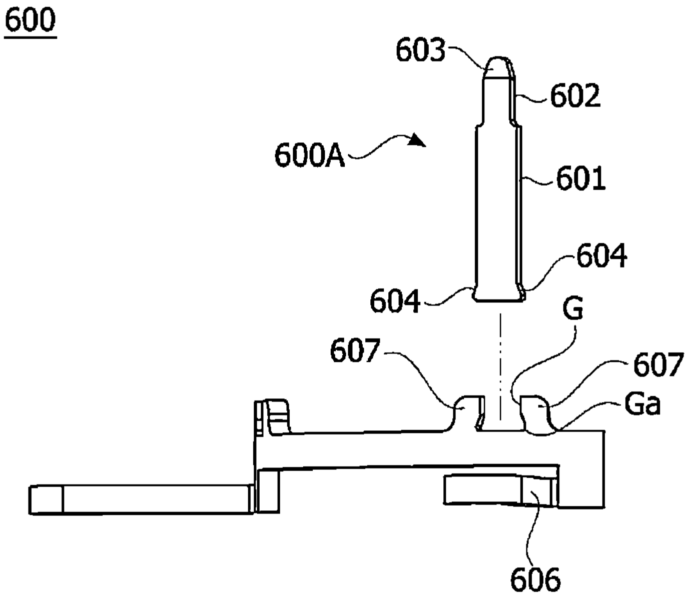
FIG. 4 is a front view illustrating the busbar illustrated in FIG. 4.

FIG. 3 is a perspective view illustrating the busbar 600, and FIG. 4 is a front view illustrating the busbar 600 illustrated in FIG. 4.

Referring to FIGS. 3 and 4, the busbars 600 connected to the cap 500 may be three busbars 600 of the U-phase, the V-phase, and the W-phase. The three busbars 600 may have the same structure. Each of the busbars 600 may include a first busbar 600A and a second busbar 600B. The first busbar 600A is connected to an external device. In addition, the second busbar 600B is fixed to the busbar holder 700 and connected to the coil 330 of the stator 300.

The first busbar 600A may include a middle portion 601 having a straight shape, an upper portion 602 disposed on the middle portion 601, a lower portion 604 disposed under the middle portion 601, and a tip portion 603 disposed on the upper portion 602. A portion of the middle portion 601 passes through the cap 500. The upper portion 602, of which a width is smaller than a width of the middle portion 601, protrudes upward from the cap 500. A width of the lower portion 604 becomes greater toward a lower side thereof than the width of the middle portion 601, and the lower portion 604 and a portion of the middle portion 601 are coupled to the second busbar 600B. The tip portion 603 is formed to become sharp toward an upper side thereof.

The second busbar 600B may include a body 605 having an arc shape and terminal portions 606 bent outward from both end portions of the body 605. The terminal portions 606 are each in contact with the coil 330. Protrusions 607 may be disposed on an upper surface of the body 605, and the protrusions 607 may be separately disposed to form a space therebetween. The space between the protrusions 607 is formed as a groove G to which the first busbar 600A is coupled. The first busbar 600A may be fitted into the groove G in an axial direction to be fixed to the second busbar 600B.

Catch grooves Ga may be disposed in lower ends of both sidewalls of the groove G. The catch grooves Ga are concavely formed in the both sidewalls of the groove G and located to catch a lower end of the first busbar 600A. Since the lower end of the first busbar 600A is caught by the catch grooves Ga, the first busbar 600A is prevented from escaping from the groove G in the axial direction. The groove G may be disposed on each of both end portions of the body 605.

Figure 5:
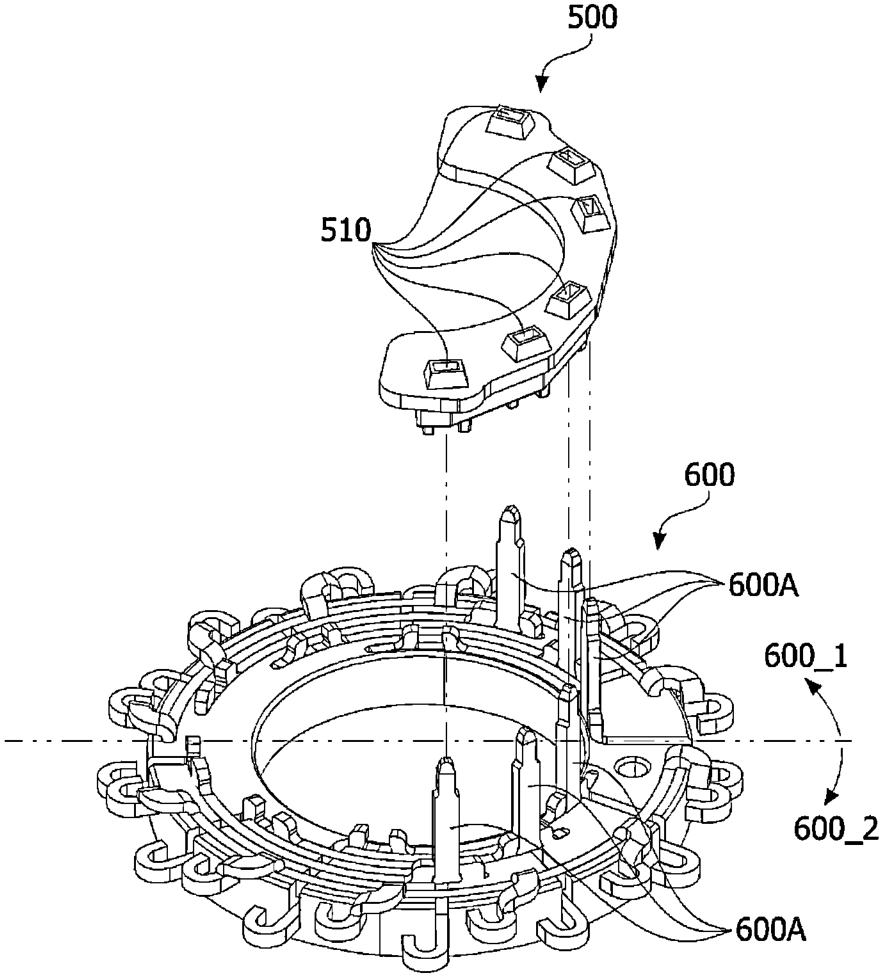
FIG. 5 is a perspective view illustrating the cap and the busbar.

FIG. 5 is a perspective view illustrating the cap 500 and the busbar 600.

Referring to FIG. 5, the first busbar 600A of the busbar 600 passes through a hole 510 of the cap 500 in the axial direction. The busbars 600 may include a first group 600_1 and a second group 600_2. Neutral and phase busbars are disposed in each of the first group 600_1 and the second group 600_2. The first group 600_1 and the second group 600_2 are each connected to the coil 330 of the stator 300 or are circuit-separated. The first group 600_1 may be disposed to be spatially divided from the second group 600_2.

Figure 6:
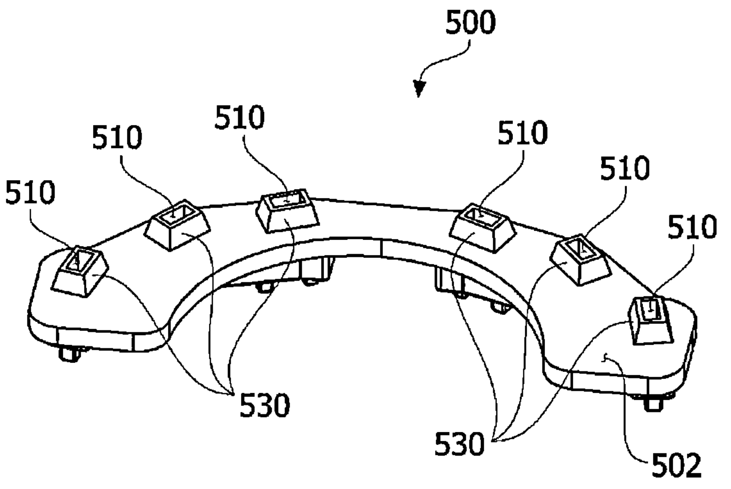
FIG. 6 is a perspective view illustrating the cap from above.
Figure 7:
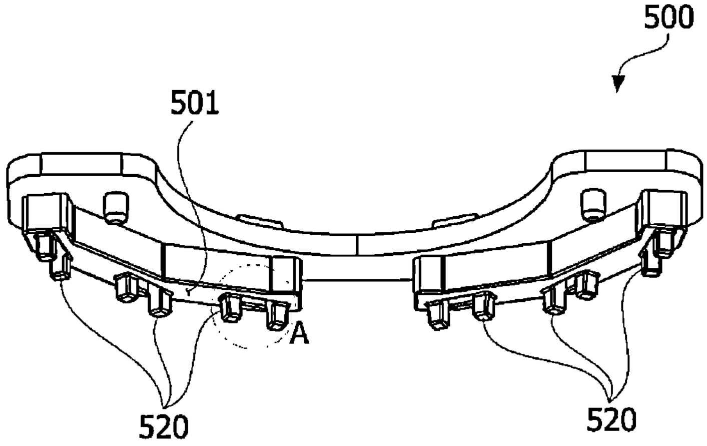
FIG. 7 is a perspective view illustrating the cap from below.
Figure 8:
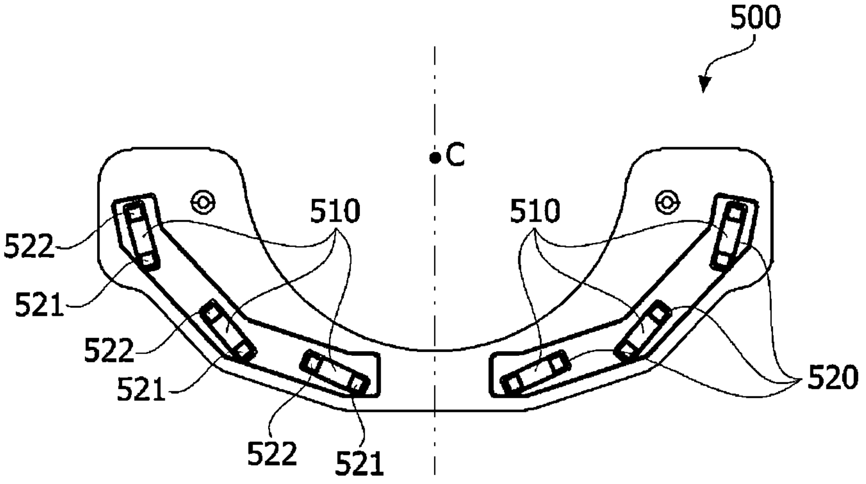
FIG. 8 is a view illustrating a lower surface of the cap.

FIG. 6 is a perspective view illustrating the cap 500 from above, FIG. 7 is a perspective view illustrating the cap 500 from below, and FIG. 8 is a view illustrating a lower surface of the cap 500.

Referring to FIGS. 4 to 8, the cap 500 includes the hole 510 and a protruding portion 520

The hole 510 is formed to pass through an upper surface and the lower surface of the cap 500. The busbar 600 passes through the hole 510. A shape of the hole 510 corresponds to a cross-sectional shape of the busbar 600. The protruding portion 520 protrudes from the lower surface of the cap 500 and is in contact with a stepped surface 610 (see FIG. 12) of the busbar 600. The protruding portion 520 presses the busbar 600 in the axial direction to serve to prevent the movement of the busbar 600.

A plurality of holes 510 and a plurality of protruding portions 520 may be disposed. Based on a reference line passing through a center of the cap 500 and an axial center C, the holes 510 and the protruding portions 520 corresponding to the busbars 600 of the first group 600_1 may be disposed at one side of the cap 500, and the holes 510 and the protruding portions 520 corresponding to the busbars 600 of the second group 600_2 may be disposed at the other side of the cap 500.

Meanwhile, the cap 500 may include a guide disposed on the upper surface thereof. A guide 530 protrudes from the upper surface and is disposed along a circumference of the hole 510 so as to serve to guide the busbar 600 which passes through the hole 510 and support the busbar 600.

Figure 9:
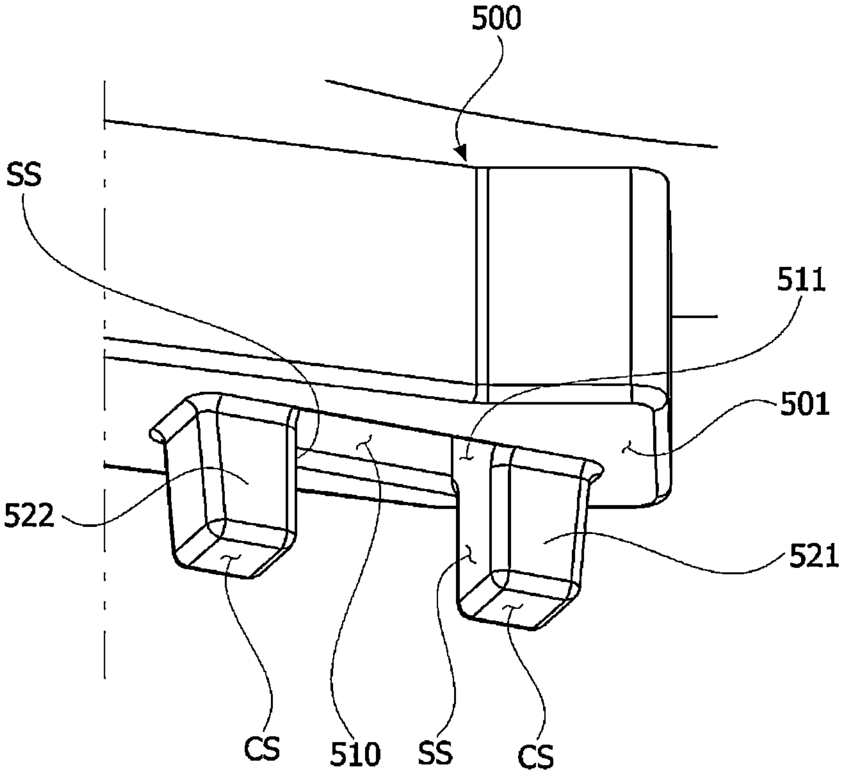
FIG. 9 is an enlarged view illustrating region A of FIG. 7, which illustrates a protruding portion.

FIG. 9 is an enlarged view illustrating region A of FIG. 7, which illustrates the protruding portion 520.

Referring to FIGS. 8 and 9, the protruding portion 520 includes a contact surface CS disposed at an end thereof. The contact surface CS is in contact with the stepped surface 610 of the second busbar 600B. The contact surface CS may be a flat surface. The protruding portion 520 may include a side surface SS forming a flat surface that continues from an inner wall of the hole 510. The side surface SS serves to guide the first busbar 600A to be inserted into the hole 510.

The protruding portion 520 may be formed as a pair of a first leg 521 and a second leg 522. The first leg 521 may be dispose adjacent to one side of the hole 510, and the second leg 522 may be disposed adjacent to the other side of the hole 510.

Figure 10:
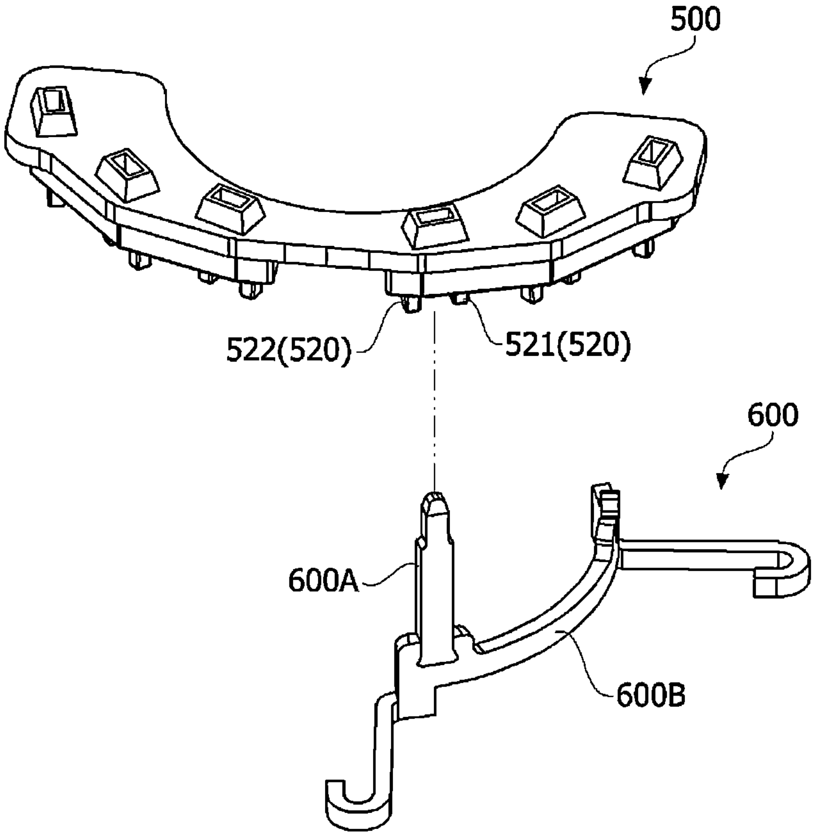
FIG. 10 is a view illustrating the busbar inserted between a first leg and a second leg of the protruding portion.
Figure 11:
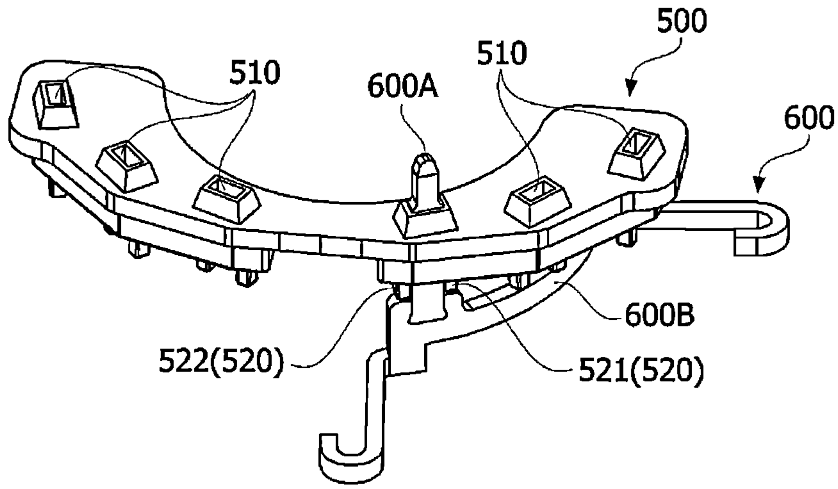
FIG. 11 is a perspective view illustrating the cap and the busbar in a state in which a first busbar passes through the cap.
Figure 12:
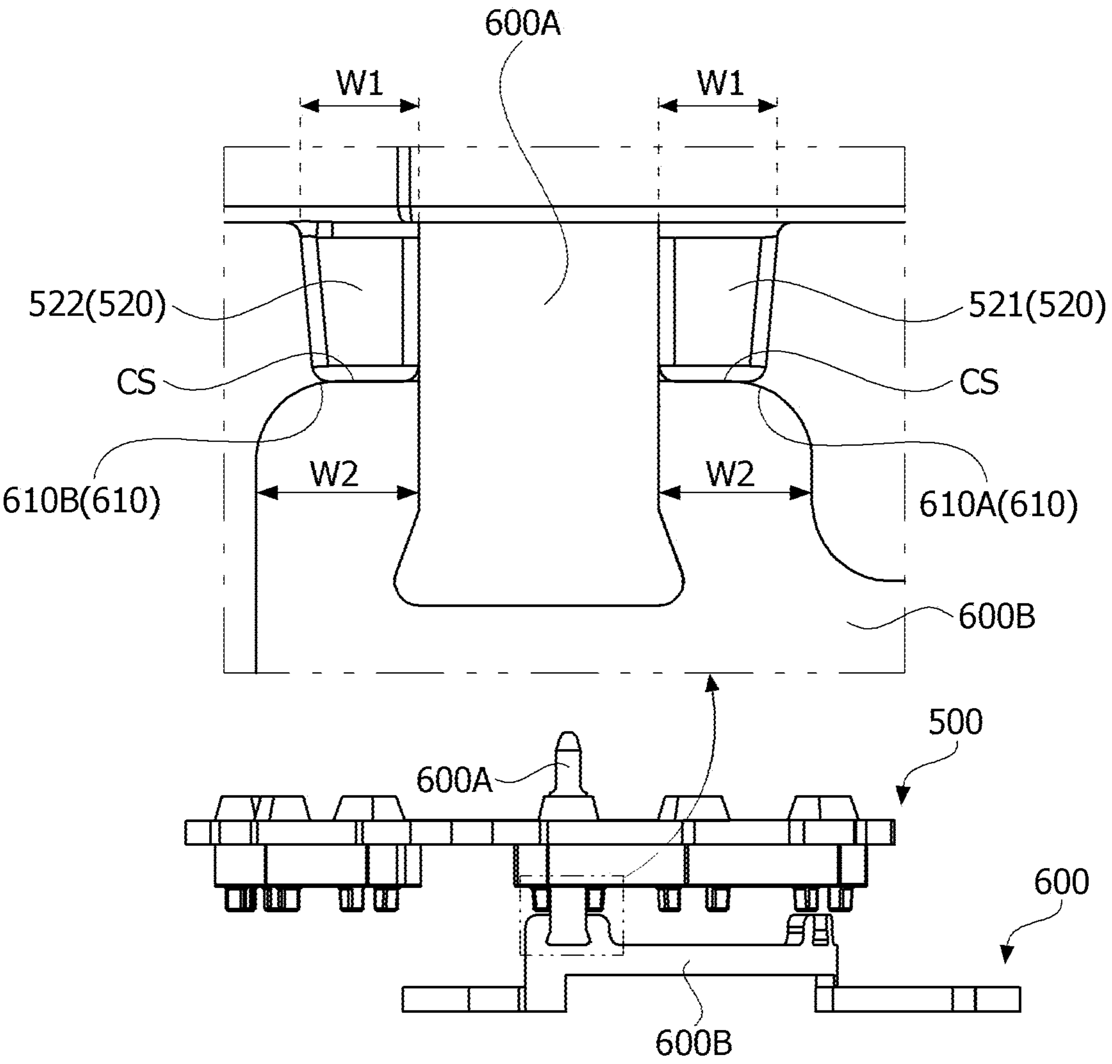
FIG. 12 is a view illustrating a state in which the protruding portion presses a stepped surface of the busbar.

FIG. 10 is a view illustrating the busbar 600 inserted between the first leg 521 and the second leg 522 of the protruding portion 520, FIG. 11 is a perspective view illustrating the cap 500 and the busbar 600 in a state in which the first busbar 600A passes through the cap 500, and FIG. 12 is a view illustrating a state in which the protruding portion 520 presses the stepped surface 610 of the busbar 600. For the sake of description, in FIGS. 10 to 12, although an example of one busbar 600 passing through the cap 500 is illustrated, the other busbars 600 pass through the cap 500 through the holes 510 of the cap 500 in the same manner.

Referring to FIGS. 10 to 12, when the cap 500 is mounted on the housing 400, the first busbar 600A is inserted between the first leg 521 and the second leg 522 and passes through the hole 510. In this case, the first leg 521 and the second leg 522 guide an end portion of the first busbar 600A so that the first busbar 600A is inserted into the hole 510.

Meanwhile, the protruding portion 520 may be formed so that a length W1 thereof in a circumferential direction decreases toward the stepped surface 610. In addition, the length W1 of the protruding portion 520 in the circumferential direction may be smaller than a length W2 of the stepped surface 610 in the circumferential direction. When the length W2 of the stepped surface 610 in the circumferential direction is relatively greater than the length W1 of the protruding portion 520 in the circumferential direction, the protruding portion 520 may stably press the busbar 600 in a process of mounting the cap 500 on the housing 400.

When the cap 500 is completely mounted on the housing 400, the contact surface CS of the protruding portion 520 is in contact with the stepped surface 610 which is an end surface of the second busbar 600B to press the second busbar 600B in the axial direction. Accordingly, even when the first busbar 600A is pulled upward, the entire busbar 600 is raised upward to prevent a location of an end of the first busbar 600A from being changed.

In addition, even when vibrations occur, since the protruding portion 520 is in contact with the second busbar 600B, the movement of the busbar 600 may be prevented.

Based on the groove G, the stepped surface 610 may be provided with a first stepped surface 610A disposed at one side of the groove G, and a second stepped surface 610B disposed at the other side of the groove G. Based on the first busbar 600A, since the first leg 521 and the second leg 522 press both the first stepped surface 610A and the second stepped surface 610B from both sides of the first busbar 600A, the location of the end of the first busbar 600A may be more effectively prevented from being changed. In addition, in this way, since the protruding portion 520 presses the stepped surface 610 in many directions, there is an advantage of more effectively preventing the movement of the busbar 600.

In addition, the first busbar 600A, as a separate part, may be coupled to the second busbar 600B fixed to the busbar holder 700, and since the protruding portion 520 of the cap

500 presses the second busbar 600B, there is an advantage of significantly reducing a tolerance occurring at the end of the first busbar 600A.

FIG. 13 is a perspective view illustrating a busbar 1600 and a busbar holder 1700, and FIG. 14 is a front view illustrating the busbar 1600 illustrated in FIG. 14.

Referring to FIGS. 13 and 14, busbars 1600 connected to a cap 500 may be three busbars 1600 with a U-phase, a V-phase, and a W-phase. The three busbars 1600 may have the same structure. The busbars 1600 are fixed to the busbar holder 1700. The busbar holder 1700 may be an annular member.

Referring to FIG. 14, the plurality of busbars 1600 may be provided with first busbars 1610, second busbars 1620, third busbars 1630, and fourth busbars 1640. The first busbars 1610, the second busbars 1620, and the third busbars 1630 may correspond to phase busbars, and the fourth busbars 1640 may correspond to neutral busbars.

The busbars 1600 may be divided into a first group B1 and a second group B2. Each of the first group B1 and the second group B2 may be provided with the first busbar 1610, the second busbar 1620, the third busbar 1630, and the fourth busbar 1640. The first group B1 and the second group B2 are formed to be circuit-separated. The first group B1 and the second group B2 may be disposed to be spatially divided from each other.

FIG. 15 is a perspective view illustrating the busbar holder 1700.

Referring to FIGS. 15 and 16, the busbar holder 1700 may be an annual member. A plurality of slots ST1 and ST2 may be disposed in one surface of the busbar holder 1700. The slots ST1 and ST2 are for accommodating the busbars 1600. The slots ST1 and ST2 may include first slots ST1 in which the busbars 1600 of the first group B1 are accommodated and second slots ST2 in which the busbars 1600 of the second group B2 are accommodated.

Portions of the slots ST1 and ST2 are formed to extend to an outer circumferential surface of the busbar holder 1700 and guide end portions of the busbars 1600 each in contact with a coil 330 to approach an outer side of the busbar holder 1700.

FIG. 16 is a side cross-sectional view illustrating the busbar holder 1700 along line A-A of FIG. 15.

Referring to FIGS. 15 and 16, the busbar holder 1700 may include a hole H. The hole H may be formed to pass through one surface and the other surface of the busbar holder 1700 in an axial direction.

A protrusion P of a housing is inserted into the hole H. The hole H may include a hole body Hc, an upper end portion Hb disposed in an upper end of the hole body Hc, and a lower end portion Ha disposed in a lower end of the hole body Hc. Each of the upper end portion Hb and the lower end portion Ha is formed so that an inner diameter increases toward an end thereof. The upper end portion Hb or the lower end portion Ha allows the protrusion P to be easily inserted into the hole body Hc.

Although the hole H is illustrated in the drawings, a groove coupled to the protrusion P may be provided instead of the hole H. The groove may be concavely formed in one surface of the busbar holder 1700 in which the slots are disposed.

FIG. 17 is a plan view illustrating the busbar holder 1700.

Referring to FIG. 17, the hole H of the busbar holder 1700 may be disposed between the first slots ST1 and the second slots ST2 in a circumferential direction. The hole H may become a reference position of the busbars 1600 in the circumferential direction, may be disposed between the busbars 1600 of the first group B1 and the busbars 1600 of the second group which are spatially divided from each other, may be disposed without being biased to the first group B1 or the second group B2, and be disposed at a boundary between the first group B1 and the second group B2, and thus there is an advantage of more easily aligning the locations of the busbars 1600 in the circumferential direction.

FIG. 18 is a partially enlarged view illustrating a bottom portion 1401 of a housing 1400.

Referring to FIG. 18, the housing 1400 may include a bearing pocket portion 1410. A space for accommodating a bearing is formed inside the bearing pocket portion 1410. The bearing pocket portion 1410 may be disposed on a bottom surface of the housing 1400 to protrude inward in the axial direction.

The protrusion P may protrude from one surface of the housing 1400 facing the busbar holder 700 in the axial direction. For example, the protrusion P may be disposed on the bottom portion 1401 of the housing 1400, in which the bearing pocket portion 1410 is disposed, in the axial direction. The protrusion P may be disposed adjacent to the bearing pocket portion 1410.

FIG. 19 is a side view illustrating the protrusion P, and FIG. 20 is a side cross-sectional view illustrating the housing 1400 and the busbar holder 1700.

Referring to FIGS. 19 and 20, the busbar holder 1700 is disposed to overlap the bearing pocket portion 1410 in a radial direction. The protrusion P is disposed to overlap the bearing pocket portion 1410 in the radial direction.

The protrusion P may have a cylindrical shape. The cylindrical protrusion P has an advantage of improving consistency with the hole H. In addition, the cylindrical protrusion P has an advantage of maximally reducing a gap between the hole H and the protrusion P. The protrusion P may be fitted into the hole H of the busbar holder 1700.

The protrusion P may have a tapered shape in which an outer diameter D2 decreases toward an end of the protrusion P from an inner surface of the housing 1400. In addition, in a region of the protrusion P, a portion of a region Pa located inside the hole H may be formed to be smaller than an inner diameter D1 of the hole H, and in the region of the protrusion P, a region Pb located outside the hole H may be formed to be greater than the inner diameter D1 of the hole H.

Since an outer diameter of the end of the protrusion P is smaller than the inner diameter D1 of the hole H, there is an advantage of easily inserting the protrusion P into the hole H. In addition, since, in the region of the protrusion P, the region Pb located outside the hole H is greater than the inner diameter D1 of the hole H, an axial location of the busbar holder 1700 is easily fixed. Accordingly, there is an advantage of more precisely managing a location of an end of the busbar 1600 in the axial direction.

Since the protrusion P is inserted into the hole H and the busbar 1600 is directly coupled to the housing 1400, an accumulated tolerance occurring at a stator 300 is removed, and thus there is an advantage of more precisely managing the location of the end of the busbar 1600 connected to an external device.

In addition, since the protrusion P protruding in the axial direction is coupled to the busbar holder 1700, there is an advantage of preventing a slip occurrence between the stator 300 and the housing 1400 in the circumferential direction.

The present invention can be used for various devices such as vehicles or home appliances.

The invention claimed is:

1. A motor comprising:

a shaft;

a rotor coupled to the shaft;

a stator disposed to correspond to the rotor;

a housing which accommodates the stator; and a cap disposed on the housing, wherein the stator includes a stator core, an insulator coupled to the stator core, and a coil disposed on the insulator and includes a busbar electrically connected to the coil and a busbar holder which supports the busbar, wherein the cap includes a hole through which the busbar passes and a protruding portion protruding from a lower surface of the cap, wherein the protruding portion is in contact with a stepped surface of the busbar, wherein the busbar includes a first busbar passing through the hole, wherein the stepped surface includes a first stepped surface disposed at one side of the first busbar and a second stepped surface disposed at the other side of the first busbar, and wherein the protruding portion is in contact with both the first stepped surface and the second stepped surface.

2. The motor of claim 1, wherein the protruding portion includes a first leg in contact with the first stepped surface and a second leg in contact with the second stepped surface, and wherein the hole is disposed between the first leg and the second leg.

3. The motor of claim 1, wherein the protruding portion includes a contact surface, wherein the contact surface is in contact with the stepped surface, and wherein the lower surface of the cap is disposed separately from the stepped surface.

4. A motor comprising:

a shaft;

a rotor coupled to the shaft;

a stator disposed to correspond to the rotor;

a housing which accommodates the stator; and a cap disposed on the housing, wherein the stator includes a stator core, an insulator coupled to the stator core, and a coil disposed on the insulator and includes a busbar electrically connected to the coil and a busbar holder which supports the busbar, wherein the busbar includes a first busbar and a second busbar, wherein the first busbar is disposed on the cap, wherein the second busbar is connected to the coil, wherein the first busbar is coupled to the second busbar, wherein the cap is in contact with the second busbar, wherein the second busbar includes a stepped surface including a first stepped surface disposed at one side of the first busbar and a second stepped surface disposed at the other side of the first busbar, and wherein the cap includes a protruding portion protruding from a lower surface of the cap, the protruding portion being in contact with both the first stepped surface and the second stepped surface.

5. The motor of claim 1, wherein the housing includes a protrusion protruding from one surface of the housing in an axial direction, and wherein the protrusion is coupled to the busbar holder.

6. The motor of claim 5, wherein the busbar holder includes a groove or hole, and wherein the protrusion is fitted into the groove or the hole.

7. The motor of claim 5, wherein the busbar holder includes a hole passing through one surface and the other surface of the busbar holder in an axial direction; and wherein the protrusion is coupled to the hole.

8. The motor of claim 6, wherein an outer diameter of at least a portion of the protrusion located outside the hole is greater than an inner diameter of the hole.

9. The motor of claim 6, wherein an outer diameter of at least a portion of the protrusion located inside the hole is smaller than an inner diameter of the hole.

10. The motor of claim 4, wherein the housing includes a protrusion protruding from one surface of the housing in an axial direction, and wherein the protrusion is coupled to the busbar holder.

11. The motor of claim 7, wherein an outer diameter of at least a portion of the protrusion located outside the hole is greater than an inner diameter of the hole.

12. The motor of claim 7, wherein an outer diameter of at least a portion of the protrusion located inside the hole is smaller than an inner diameter of the hole.

13. The motor of claim 10, wherein the busbar holder includes a groove or hole, and wherein the protrusion is fitted into the groove or the hole.

14. The motor of claim 10, wherein the busbar holder includes a hole passing through one surface and the other surface of the busbar holder in an axial direction; and wherein the protrusion is coupled to the hole.

15. The motor of claim 13, wherein an outer diameter of at least a portion of the protrusion located outside the hole is greater than an inner diameter of the hole.

16. The motor of claim 13, wherein an outer diameter of at least a portion of the protrusion located inside the hole is smaller than an inner diameter of the hole.

17. The motor of claim 14, wherein an outer diameter of at least a portion of the protrusion located outside the hole is greater than an inner diameter of the hole.

18. The motor of claim 14, wherein an outer diameter of at least a portion of the protrusion located inside the hole is smaller than an inner diameter of the hole.

* * * * *